United States Patent
Hsieh

(10) Patent No.: US 11,552,367 B2
(45) Date of Patent: Jan. 10, 2023

(54) BATTERY HOLDER STRUCTURE

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 198 days.

(21) Appl. No.: 17/099,739

(22) Filed: Nov. 16, 2020

(65) Prior Publication Data

US 2021/0193978 A1     Jun. 24, 2021

(30) Foreign Application Priority Data

Dec. 19, 2019   (TW) .................................. 108146761

(51) Int. Cl.
*H01M 50/213*      (2021.01)
*B25F 5/02*        (2006.01)
*B25B 23/142*      (2006.01)

(52) U.S. Cl.
CPC ............. *H01M 50/213* (2021.01); *B25F 5/02* (2013.01); *B25B 23/1425* (2013.01); *H01M 2220/30* (2013.01)

(58) Field of Classification Search
CPC ............... H01M 50/12; H01M 50/247; H01M 2220/30; B25F 5/02; B25B 23/142
See application file for complete search history.

(56) References Cited

U.S. PATENT DOCUMENTS 7,263,916 B1    9/2007 Wu
2013/0199344 A1  8/2013 Lee

FOREIGN PATENT DOCUMENTS

| CN | 105751095 A  |   | 7/2016 |
| CN | 206393533 U  |   | 8/2017 |
| EP | 2639014 A1   |   | 9/2013 |
| JP | 08162083 A   | * | 6/1996 |
| TW | 200829382 A  |   | 7/2008 |
| TW | 200900200 A  |   | 1/2009 |
| TW | 201908072 A  |   | 3/2019 |

* cited by examiner

*Primary Examiner* — Adam A Arciero
(74) *Attorney, Agent, or Firm* — CKC & Partners Co., LLC

(57) ABSTRACT

A battery holder structure is disposed on an electric wrench which includes a battery unit, and the battery holder structure includes a back cover assembly. The back cover assembly is assembled on an end of the electric wrench, and the back cover assembly includes a cover, a supporting member, a first elastic member and a second elastic member. The cover has an accommodating space. The supporting member is disposed in the accommodating space. The first elastic member is assembled on an end of the supporting member, an end of the first elastic member contacts with the cover, and another end of the first elastic member contacts with the supporting member. The second elastic member is assembled on another end of the supporting member, an end of the second elastic member contacts with the supporting member, and another end of the second elastic member contacts with the battery unit.

8 Claims, 7 Drawing Sheets

US 11,552,367 B2

BATTERY HOLDER STRUCTURE

RELATED APPLICATIONS

This application claims priority to Taiwan Application Serial Number 108146761, filed Dec. 19, 2019, which is herein incorporated by reference.

BACKGROUND

Technical Field

The present disclosure relates to a battery holder structure. More particularly, the present disclosure relates to a battery holder structure applicable to electric wrenches.

Description of Related Art

A torque wrench is a common locking tool. Roughly speaking, the torque wrench is corresponding to a sleeve with a specific mechanical structure to apply a specific torque on screws. In many situations, a positioning precision, a locking stability and a reliability of locking the screws are severely demanded, and the torque wrench is especially important to a heavy equipment (such as aircrafts, various automobiles, ships, a large machinery, and so on) which needs to bear a heavy loading and a strong impact force and has a high security demand. One of key factors of the reason why the torque wrench is popular is that a preset torque value of the torque wrench can be preset to reinforce a torque of the torque wrench until reaching the preset torque value. Therefore, a torque value is controllable. To obtain a variation of the torque or an angle of the torque wrench during locking the screws, the variation of the torque or the angle is usually sensed via sensors, and the torque value of the torque or an angle value of the angle is showed via the torque wrench equipped with displays. The torque value or the angle value is early showed via the aforementioned displays with a pointer needle corresponding to scales. Recently, digitization displays of the torque value or the angle value have been developed, and users can intuitively read via the digitization displays.

The aforementioned electronic elements, such as the sensors or the displays, can be only operated by a power supply. Accommodating rooms are disposed in electric wrenches, and the accommodating rooms are for disposing batteries. However, in many occasions, especially when locking elements of heavy machinery, a volume of the heavy machinery is huge, and the screws are usually disposed on a nonplanar surface. In the aforementioned situation, the accommodating rooms for disposing the batteries are easily shaken or impacted owing to a large tilt angle of the electric wrenches. Hence, the batteries are hardly fixed, and the batteries cannot conduct electricity.

Therefore, a development of the electric wrenches, which the batteries can be fixedly disposed in, is necessary. Furthermore, the electric wrenches can be used while the large tilt angle.

SUMMARY

According to one aspect of the present disclosure, a battery holder structure is disposed on an electric wrench which includes a battery unit, and the battery holder structure includes a back cover assembly. The back cover assembly is assembled on an end of the electric wrench, and the back cover assembly includes a cover, a supporting member, a first elastic member and a second elastic member. The cover has an accommodating space. The supporting member is disposed in the accommodating space. The first elastic member is assembled on an end of the supporting member, wherein an end of the first elastic member contacts with the cover, and another end of the first elastic member contacts with the supporting member. The second elastic member is assembled on another end of the supporting member, wherein an end of the second elastic member contacts with the supporting member, and another end of the second elastic member contacts with the battery unit.

DETAILED DESCRIPTION

Figure 1:
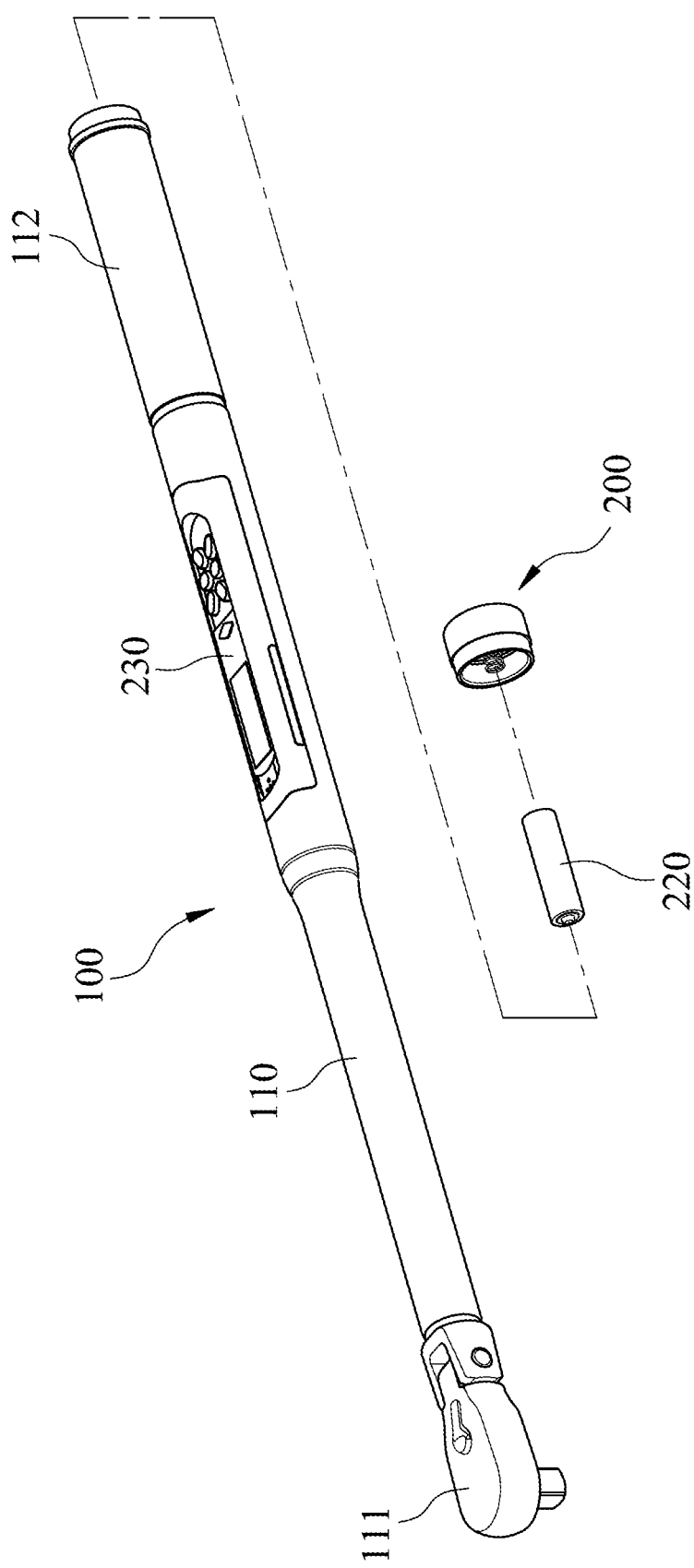
FIG. 1 is a three-dimensional exploded view of a battery holder structure assembled with an electric wrench according to an embodiment of the present disclosure.
Figure 2:
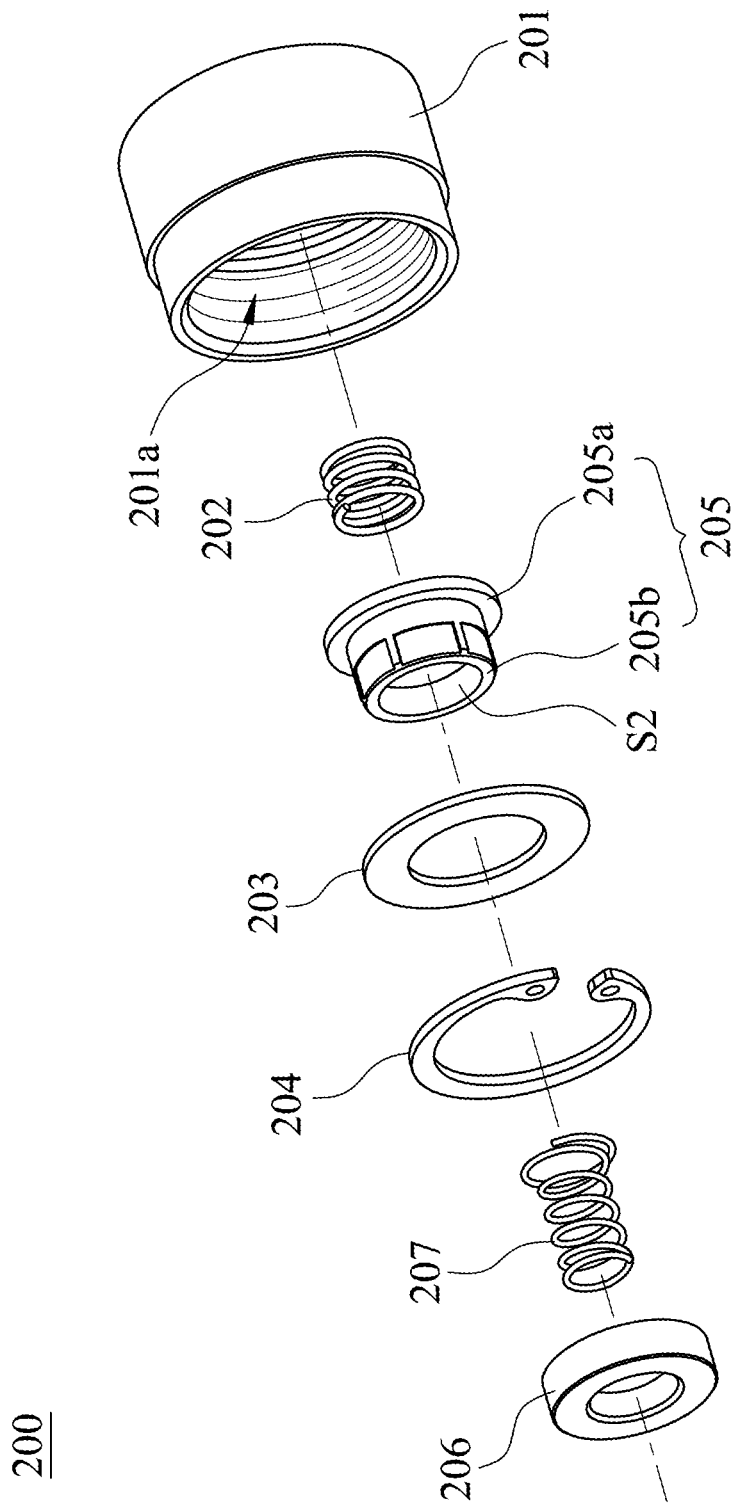
FIG. 2 is an enlarged exploded view of components of a back cover assembly of the battery holder structure according to the embodiment of FIG. 1.
Figure 3:
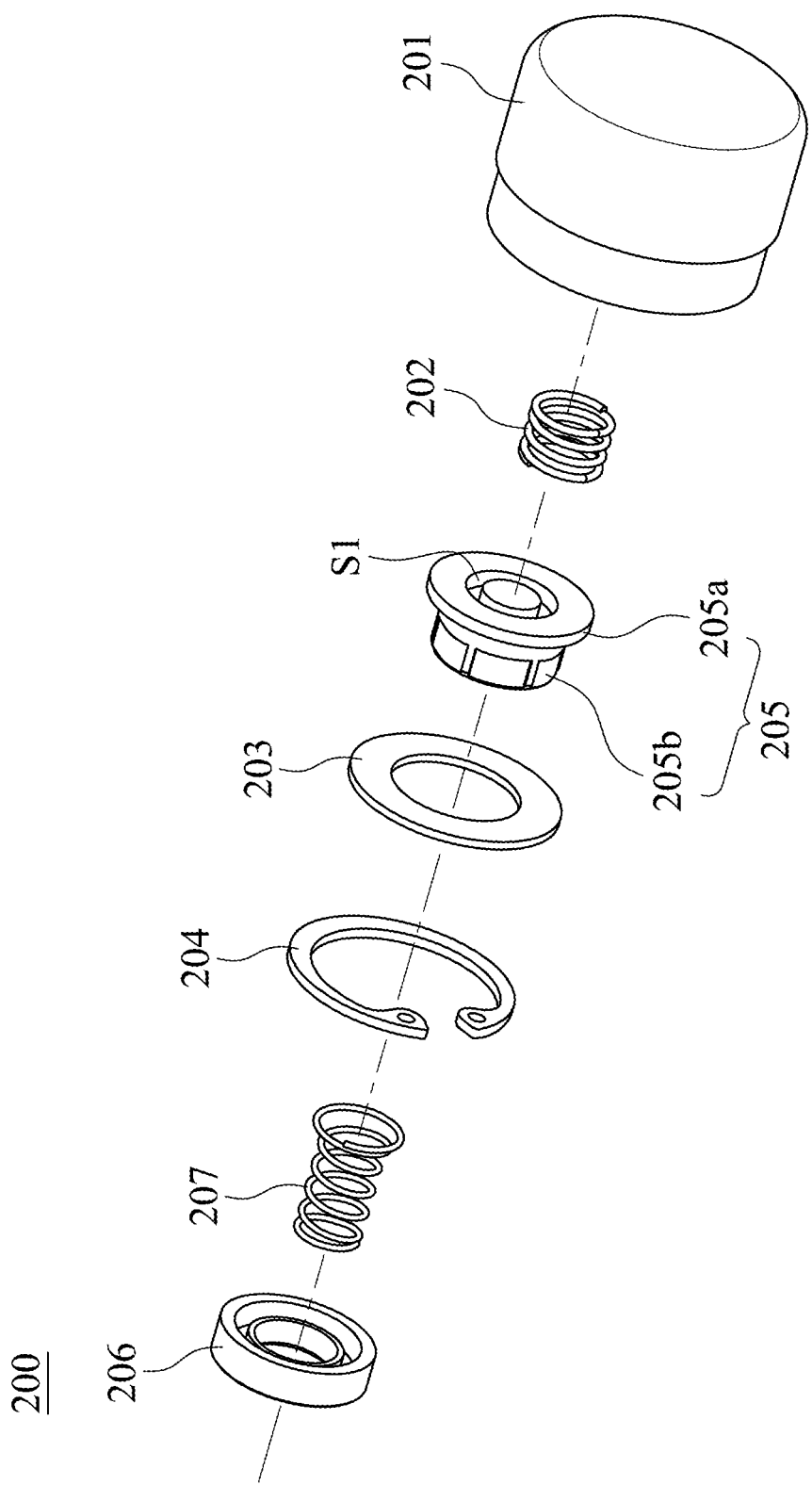
FIG. 3 is an enlarged exploded view of the back cover assembly of the battery holder structure from another visual angle according to the embodiment of FIG. 1.
Figure 5:
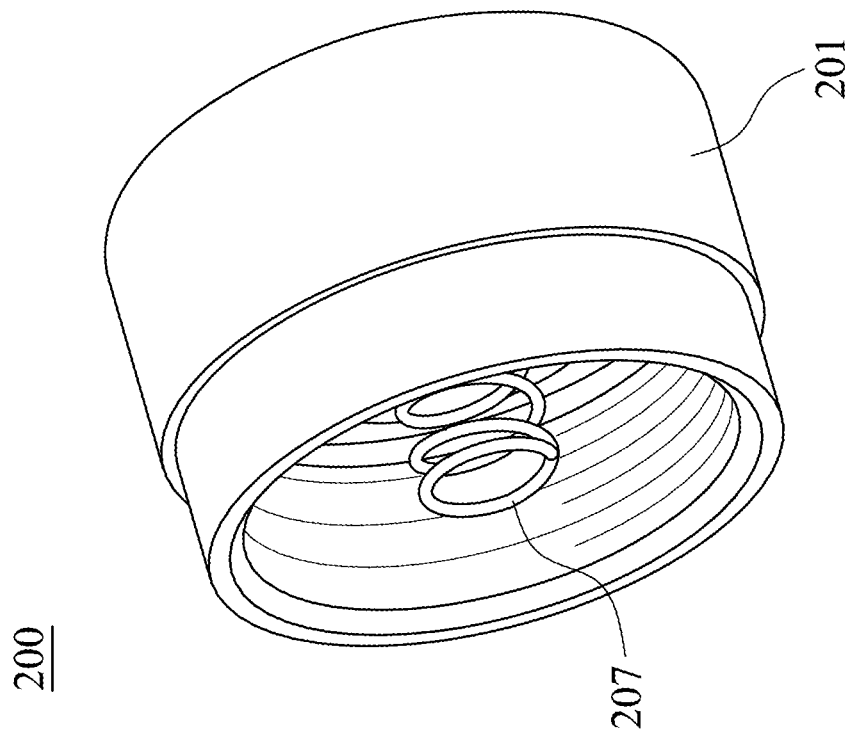
FIG. 5 is an assembly view of the back cover assembly of the battery holder structure according to the embodiment of FIG. 2.
Figure 4:
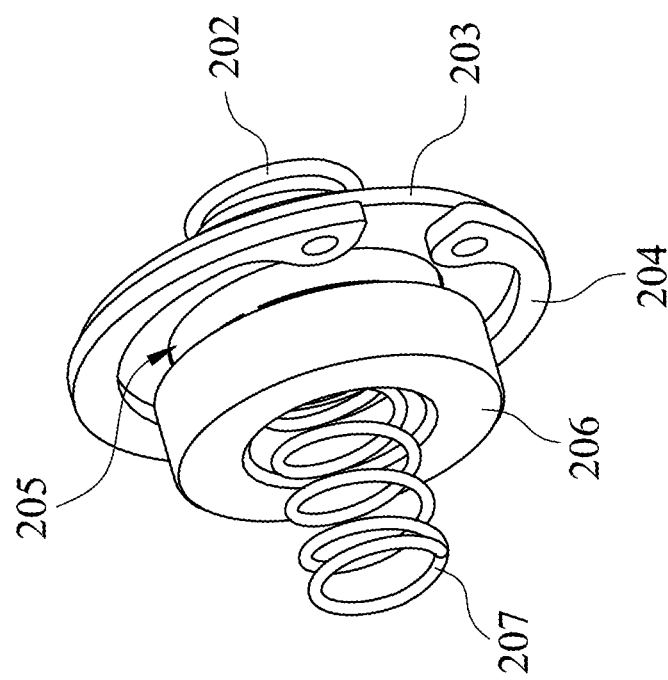
FIG. 4 is an assembly schematic view of partial components of the back cover assembly of the battery holder structure according to the embodiment of FIG. 2.
Figure 6:
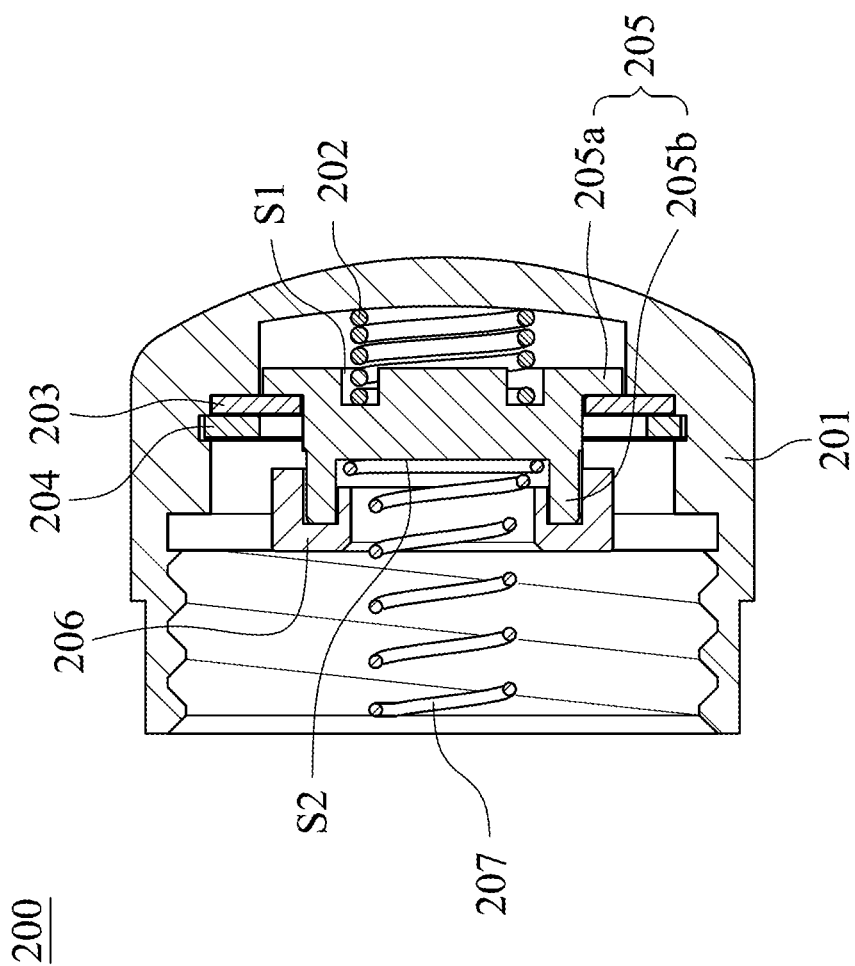
FIG. 6 is a cross-section view of the back cover assembly according to the embodiment of FIG. 5.

Please refer to FIGS. 1 to 6, wherein FIG. 1 is a three-dimensional exploded view of a battery holder structure assembled with an electric wrench 100 according to an embodiment of the present disclosure, FIG. 2 is an enlarged exploded view of components of a back cover assembly 200 of the battery holder structure according to the embodiment of FIG. 1, FIG. 3 is an enlarged exploded view of the back cover assembly 200 of the battery holder structure from another visual angle according to the embodiment of FIG. 1, FIG. 4 is an assembly schematic view of partial components of the back cover assembly 200 of the battery holder structure according to the embodiment of FIG. 2, FIG. 5 is an assembly view of the back cover assembly 200 of the battery holder structure according to the embodiment of FIG. 2, and FIG. 6 is a cross-section view of the back cover assembly 200 according to the embodiment of FIG. 5.

In FIG. 1, the electric wrench 100 includes a shaft 110. An end of the shaft 110 is connected to a driving head 111, and another end of the shaft 110 includes an accommodating room 112. A battery unit 220 is disposed in the accommodating room 112. Meanwhile, the electric wrench 100 further includes a display module 230 and a plurality of sensors (not shown). All of the display module 230 and the sensors are disposed on the shaft 110. All of the display 230 and the sensors are electrically connected to the battery unit 220, and an electricity which an operation of the electric wrench 100 needs can be provided via the battery unit 220. A number of the battery unit 220 can be adjusted according to an actual situation. The driving head 111 can be sleeved on a workpiece, and a torque can be applied on the workpiece via the driving head 111 of the electric wrench 100. The torque or an angle can be sensed via the sensors, and a numerical value thereof can be displayed on the display module 230.

The battery holder structure (its reference numeral is omitted) is assembled on the electric wrench 100, and the battery holder structure includes the back cover assembly 200. The back cover assembly 200 is assembled on an end of the electric wrench 100. After assembling, the back cover assembly 200 is covered and sealed via the accommodating room 112, and hence the components in the back cover assembly 200 are not exposed. That is, most of the components of the battery holder structure are assembled in the back cover assembly 200. The back cover assembly 200 includes a cover 201, a supporting member 205, a first elastic member 202 and a second elastic member 207. The cover 201 includes an accommodating space 201a. The supporting member 205 is disposed in the accommodating space 201a. The first elastic member 202 is assembled on an end of the supporting member 205. An end of the first elastic member 202 contacts with the cover 201, and another end of the first elastic member 202 contacts with the supporting member 205. The second elastic member 207 is assembled on another end of the supporting member 205. An end of the second elastic member 207 contacts with the supporting member 205, and another end of the second elastic member 207 contacts with the battery unit 220. The first elastic member 202 and the second elastic member 207 can be corresponding to each other to mitigate a shake and an impact of the battery unit 220, and the aforementioned contents will be detailedly described at the following paragraphs.

In FIGS. 2 and 3, the supporting member 205 includes a stop portion 205a and a convex portion 205b. The convex portion 205b is located on an end of the stop portion 205a. The stop portion 205a includes a first accommodating portion S1 located on another end of the stop portion 205a. The another end of the first elastic member 202 can be disposed in the first accommodating portion S1. The convex portion 205b includes a second accommodating portion S2 located on an end of the convex portion 205b. The end of the second elastic member 207 can be disposed in the second accommodating portion S2. Furthermore, each of the first accommodating portion S1 and the second accommodating portion S2 can be an embedded groove or a concave groove. According to the embodiments of FIGS. 2 and 3, the first accommodating portion S1 is the embedded groove, and the second accommodating portion S2 is the concave groove, but is not limited thereto.

In FIGS. 2 to 6, the battery holder structure can further include a gasket 203, a retaining ring 204 and a collar 206. The gasket 203 is covered on the stop portion 205a. The retaining ring 204 is buttoned up the gasket 203. Therefore, the supporting member 205 can be fixedly disposed in the cover 201. The second elastic member 207 is disposed through the collar 206, and the collar 206 is covered on the convex portion 205b of the supporting member 205. Therefore, the second elastic member 207 can be fixed to avoid the shake of the second elastic member 207 during operating the electric wrench 100.

Figure 7:
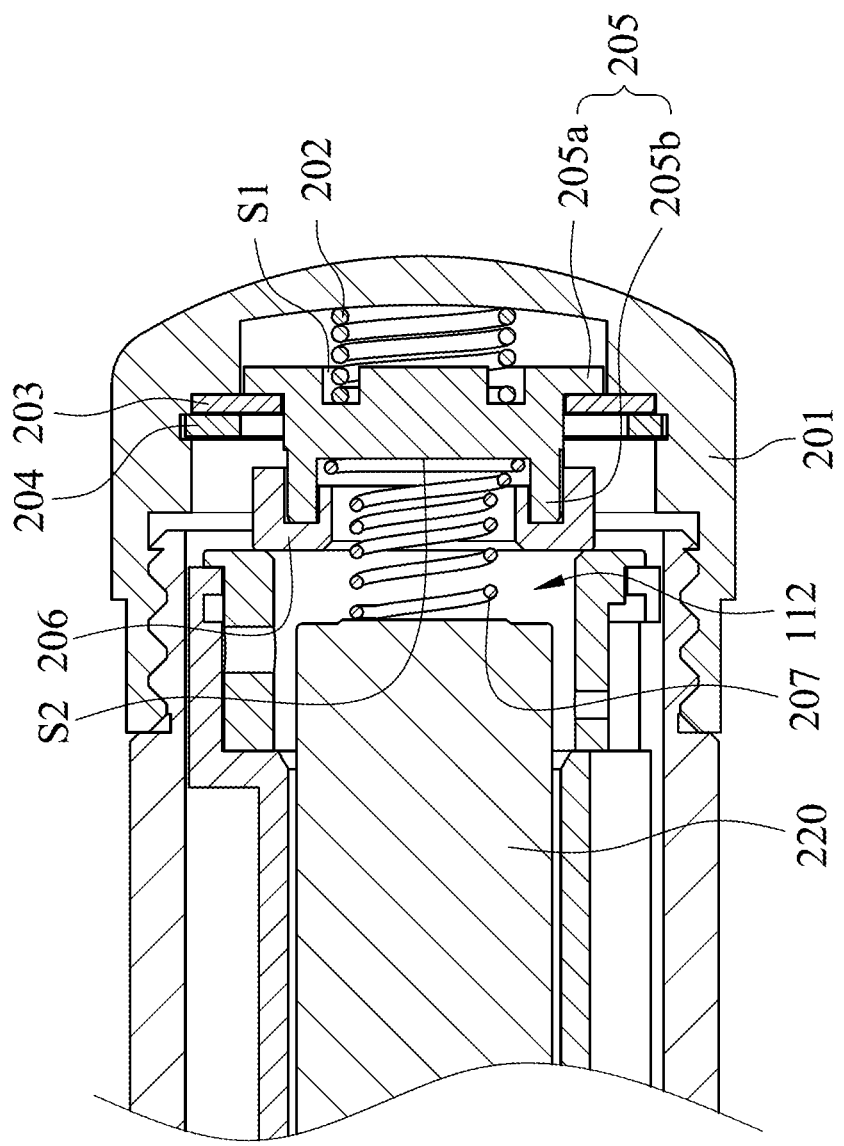
FIG. 7 is a cross-section view of a usage status of a battery holder structure according to an embodiment of the present disclosure.
Figure 8:
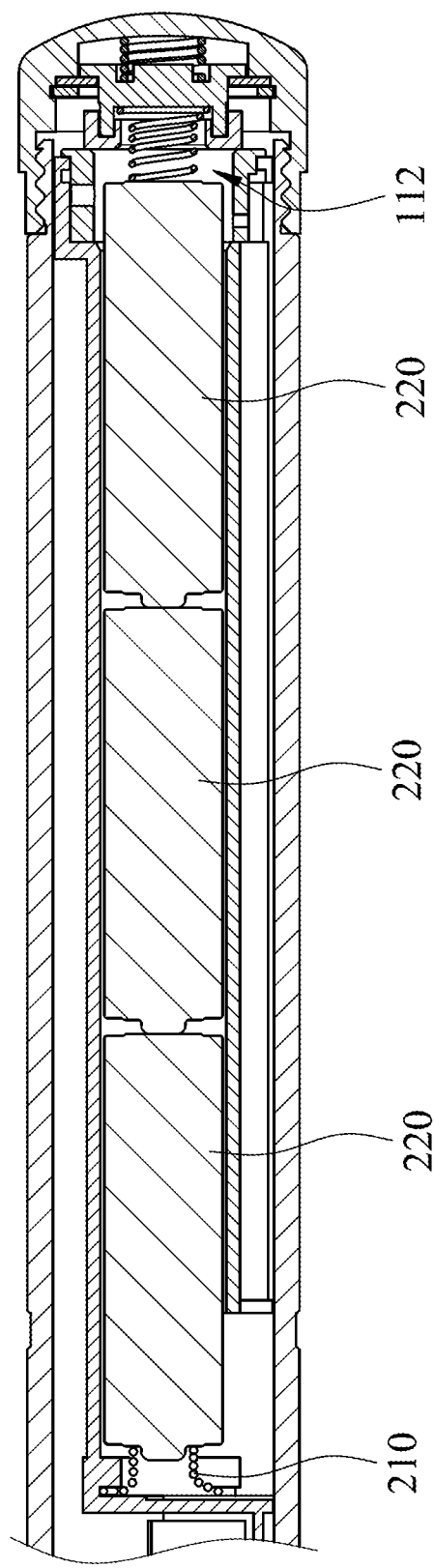
FIG. 8 is a partially enlarged view of the battery holder structure assembled with an electric wrench according to the embodiment of FIG. 7.

Please refer to FIGS. 7 and 8, wherein FIG. 7 is a cross-section view of a usage status of a battery holder structure according to an embodiment of the present disclosure, and FIG. 8 is a partially enlarged view of the battery holder structure assembled with an electric wrench 100 according to the embodiment of FIG. 7.

In FIG. 7, when the battery holder structure is assembled on the electric wrench 100, a second elastic member 207 is sealed in an accommodating room 112 of the electric wrench 100 via the back cover assembly 200 to avoid the shake of the second elastic member 207 during operating the electric wrench 100.

In FIGS. 7 and 8, the battery holder structure further includes a third elastic member 210 disposed in the accommodating room 112. An end of the third elastic member 210 contacts with an electrode of a battery unit 220. That is, according to the embodiment of FIG. 7, after three battery units 220 assembled in the accommodating room 112 of the electric wrench 100 (shown in FIG. 1), the back cover assembly 200 (shown in FIG. 1) is locked on an end of the electric wrench 100 by screwing screws to cover and seal the accommodating room 112. The three battery units 220 are connected in series to form a battery assembly, and a cathode of the battery assembly contacts with and compresses the second elastic member 207. An anode of the battery assembly contacts with and compresses the third elastic member 210 (shown in FIG. 8). When the supporting member 205 is assembled in the cover 201, the first elastic member 202 is compressed. The second elastic member 207 and the third elastic member 210 are not only for fixing the battery units 220, but also for providing an electric conductivity of the battery units 220. Moreover, a collar 206 can be made of a conductive metal material, such as a copper material. In general, when the electric wrench 100 is operated with a large tilt angle, the battery units will easily depart from a position thereof because of the shake or the impact from external. By a cooperation of each of elasticities of the first elastic member 202 and the second elastic member 207, the impact or the shake caused by the operation of the electric wrench 100 can be absorbed to solve the aforementioned problem to avoid losing a conductivity. In the aforementioned embodiments, a type and a number of the battery units 220 can be chosen according to the actual situation, and a connection way of the battery units 220 is not especially limited. That is, the battery units 220 can be connected in series, parallel, or both series and parallel at the same time, and it depends on the actual situation.

It should be mentioned that each of the anode and the cathode of the battery assembly contacts with the another end of the second elastic member 207 and the end of the third elastic member 210, and another end of the third elastic member 210 can be electrically connected to the display module 230 via a metal conductive sheet (not shown) or an electric wire (not shown). Therefore, the electricity of the battery assembly can be transmitted to the display module 230 to form a whole circuit, but is not limited thereto.

In particular, by the cooperation of each of the elasticities of the first elastic member 202 and the second elastic member 207 assembled in the back cover assembly 200 of the battery holder structure of the present disclosure, the impact or the shake caused by the operation of the electric wrench 100 can be absorbed to avoid losing a conduction of the battery units 220.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. A battery holder structure, disposed on an electric wrench comprising a battery unit, and the battery holder structure comprising:
    a back cover assembly assembled on an end of the electric wrench, and the back cover assembly comprising:
        a cover having an accommodating space;
        a supporting member disposed in the accommodating space, and comprising:
            a stop portion; and
            a convex portion located on an end of the stop portion;
        a first elastic member assembled on an end of the supporting member, wherein an end of the first elastic member contacts with the cover, and another end of the first elastic member contacts with the supporting member; and
        a second elastic member assembled on another end of the supporting member, wherein an end of the second elastic member contacts with the supporting member, and another end of the second elastic member contacts with the battery unit;
    wherein the stop portion comprises a first accommodating portion located on another end of the stop portion, and the another end of the first elastic member is disposed in the first accommodating portion;
    wherein the convex portion comprises a second accommodating portion located on an end of the convex portion, and the end of the second elastic member is disposed in the second accommodating portion.

2. The battery holder structure of claim 1, further comprising:
    a third elastic member disposed in an accommodating room of the electric wrench, wherein an end of the third elastic member contacts with an electrode of the battery unit.

3. The battery holder structure of claim 1, wherein the electric wrench further comprises a display module and a sensor, and both of the display module and the sensor are disposed on a shaft of the electric wrench and electrically connected to the battery unit.

4. The battery holder structure of claim 1, further comprising:
    a gasket covered on the stop portion.

5. The battery holder structure of claim 4, further comprising:
    a retaining ring buttoned up the gasket.

6. The battery holder structure of claim 1, further comprising:
    a collar, wherein the second elastic member is disposed through the collar, and the collar is covered on the convex portion.

7. The battery holder structure of claim 6, wherein the collar is made of a conductive metal material.

8. The battery holder structure of claim 1, wherein each of the first accommodating portion and the second accommodating portion is an embedded groove or a concave groove.

* * * * *